May 20, 1941.  H. F. FLOWERS  2,242,855
AIR COOLED BRAKING EQUIPMENT
Original Filed May 20, 1939

Inventor
Henry Fort Flowers
By Mason - Porter
Attorneys

Patented May 20, 1941

2,242,855

UNITED STATES PATENT OFFICE 2,242,855

AIR COOLED BRAKING EQUIPMENT

Henry Fort Flowers, Findlay, Ohio

Original application May 20, 1939, Serial No. 274,848. Divided and this application March 29, 1940, Serial No. 326,779

7 Claims. (Cl. 188—264)

The invention relates generally to braking equipments, and more particularly to braking equipments adaptable for use on tandem wheel truck structures of the type disclosed in my co-pending application for U. S. Letters Patent 274,848, filed May 20, 1939, of which the present application constitutes a division, and it primarily seeks to provide a novel air cooled braking equipment.

In the manufacture of present day rolling stock it is customary to form wheels of a central spider of metal and a tire of steel usually shrunk onto the wheel spider, and considerable difficulty has been occasioned by expansion of these tires away from and loosening of them on the spiders due to the heat of friction generated by application of brake shoes to the steel tires, according to common practice.

It is therefore an object of the present invention to provide a novel braking equipment in which air cooled braking surfaces are provided at the sides of the wheel spider and in which brake shoes are applied to said surfaces so that the heat of friction will cause the wheel spider to expand into the steel tire and tighten the tire on the wheel rather than loosen it.

Another object of the invention is to provide a wheel structure having a spider of grey iron or other suitable braking surface material and including annular braking surfaces at the respective side faces thereof, a surrounding steel tire, and a novel arrangement of braking equipment including actuating devices and brake shoes engageable simultaneously with the annular braking surfaces.

Another object of the invention is to provide a novel ventilated wheel structure including a hollow interior and means for circulating air therethrough, and braking surfaces disposed in a novel manner for preventing separation of the wheel body or spider and the surrounding steel tire due to excessive heat of friction generated during braking operations.

With the above and other objects in view that will hereinafter appear, the nature of the invention will be more clearly understood by following the detailed description, the appended claims, and the several views illustrated in the accompanying drawing.

In the drawing—

Figure 1:
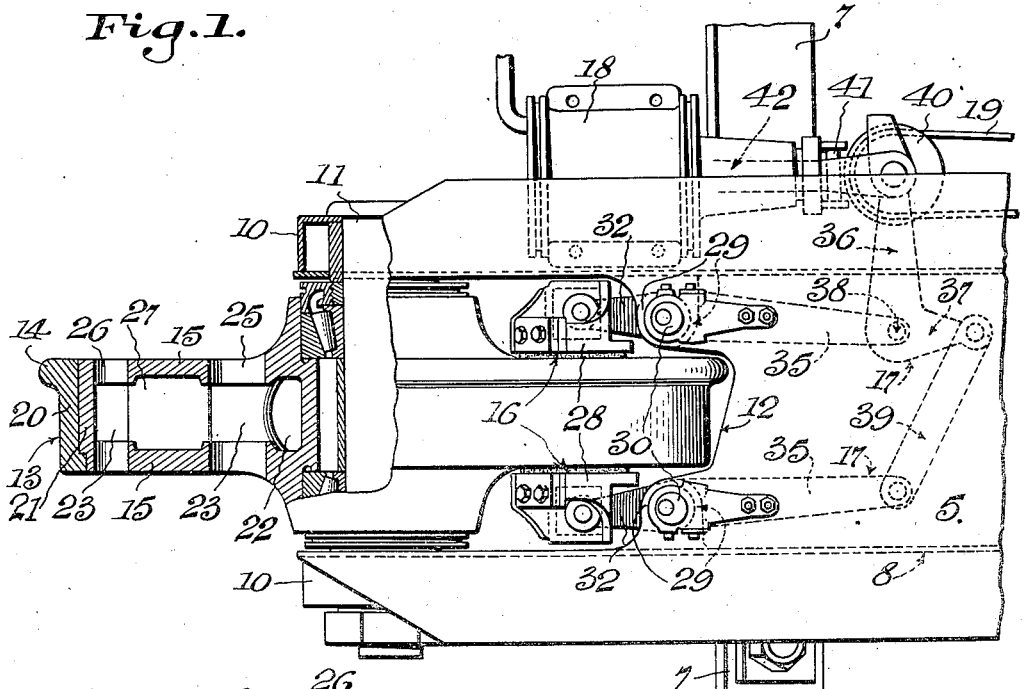
Figure 1 is a fragmentary plan view and part horizontal section illustrating the invention.
Figure 2:
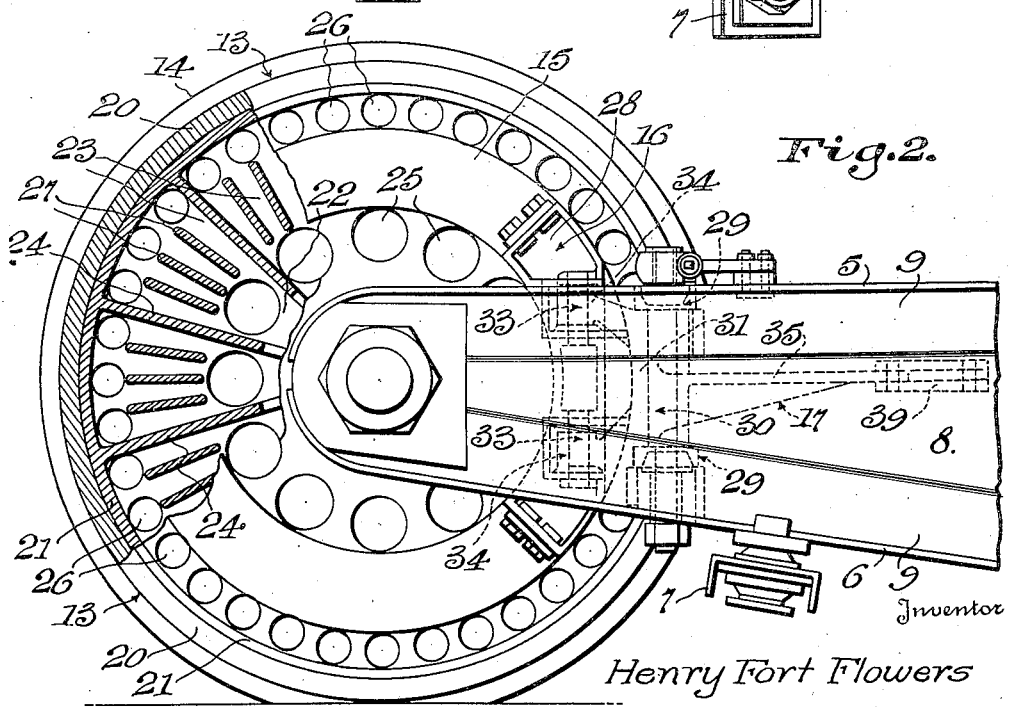
Figure 2 is a face view of the parts illustrated in Figure 1, parts being shown in vertical longitudinal section.

In the example of embodiment of the invention herein disclosed only one end of a tandem wheel truck is illustrated, the complete truck structure being shown in the co-pending parent application hereinbefore referred to.

The truck element includes horizontally disposed upper plating 5 and opposed lower plating 6. Each truck element carries a track engaging wheel at each end and is pivoted intermediate its ends to a frame bolster, the companion elements at opposite sides of the truck being held in generally parallel relation by a cross tie bar 7, all as disclosed in detail in said parent application. The sides of each truck element are closed by suitably spaced side plating 8, and the side and top and bottom plating is suitably reinforced by angular plates 9 welded to said plating.

Bearing boxes 10 are secured in spaced relation at each end of each truck element, and each pair of such boxes serves to support a stub axle 11 on which a wheel is rotatably mounted. Each wheel is accommodated in bifurcations 12 in the plating 5 and 6 and includes a tread surface 13, the usual flange 14 and laterally disposed brake ring portions 15.

The brake ring portions 15 are opposed by arcuate brake shoes 16 controlled by suitable actuator devices generally designated 17 and to which movement can be applied by application of fluid pressure, through the brake cylinder equipments generally designated 18, or manually through suitable tackle generally designated 19.

The tread surfaces and the flanges 14 of each wheel hereinbefore mentioned only generally are formed on a steel alloy tread ring 20 which encompasses the main body portion 21 preferably formed of gray iron or other suitable braking surface material and which includes the hub structure and the brake ring portions 15 previously referred to. The laterally presented braking surfaces of the rings 15 preferably are polished over the whole area to be engaged by the brake shoes.

Each wheel is cored out to provide a central annular chamber 22 and a plurality of radial chambers 23 formed between radial partitions 24 merging with the periphery of the wheel body 21 and which terminate at their inner ends to form the annular chamber 22. Each lateral wall of the wheel body 21 is provided with an annular row of large inlet apertures 25 disposed just inside the brake rings 15, and with a similar row of smaller outlet apertures 26 just outside said rings. Each chamber 23 is divided between the inner and outer rows of apertures 25 and 26 into four radial sub-passages by three radial partition members or blades 27.

As each wheel rotates, air will be drawn into the inlet apertures 25 adjacent the hub and will be expelled through the discharge apertures 26. The transverse radial fins 27 connecting and reinforcing the two side walls at the positions of the brake rings 15 serve as fan blades for increasing the velocity of the air as the speed of the wheel is increased. By reason of the provision of this ventilating equipment the wheel structures are efficiently cooled during travel of the vehicle, and the cooling effect increases as the speed increases so as to avoid excessive heating at high speeds.

In the improved wheel structure herein disclosed the heat of friction resulting from the application of the brake shoes to the lateral braking ring faces is dissipated by the wheel ventilating equipments, and by reason of the fact that the braking force is applied to the gray iron wheel portion 21 the heat generated tends to expand the inner wheel body into and tighten the tire rather than loosen it, as would be the case should the braking force be applied to the tire.

Each brake shoe 16 includes an arcuate body 28 to which a pad of suitable braking material is removably affixed. At each side of each wheel, each truck frame element is provided with a vertically spaced pair of bearing lugs 29 in which a pivot pin 30 is mounted. Between the bearing lugs 29 supporting each pin there is rockably mounted an actuator sleeve 31.

Each sleeve 31 has upper and lower brake shoe carrying arms 32 projected therefrom, and the free ends of these arms are pivotally secured at 33 in the respective brake shoe mounting eyes 34. Each sleeve 31 also includes a centrally disposed actuator arm 35 which projects therefrom in a direction opposite the direction of projection of the previously mentioned arms 32.

By reference to Figure 1 of the drawing it will be obvious that as the free ends of each cooperating pair of the actuator arms 35 are moved toward each other they will force the associated brake shoes away from the wheel disposed between them, whereas when said arm ends are moved in the opposite direction, or separated, the brake shoes will be applied to said wheel.

In order to impart the necessary movements to the actuator arms 35 for applying and releasing the brakes, the inner arm of each associated pair has mounted thereon a bell crank lever having a long arm 36 and a short arm 37, said lever being pivoted to the free end of the actuator arm as at 38. The short arm 37 is link-connected as at 39 to the free end of the other actuator arm 35, and the free end of the long arm 36 carries a pulley 40 and is connected as at 41 with the piston rod 42 of a brake cylinder 18 supported on the truck unit frame and to which fluid pressure is applied in any approved manner (not shown) for actuating the brakes by fluid pressure.

It is of course to be understood that the details of structure and arrangement of parts may be variously changed and modified without departing from the spirit and scope of my invention.

I claim:

1. In a braking equipment of the character described, a wheel comprising a spider body including a tire receiving rim portion and opposed side walls extending integrally inwardly therefrom and forming an air chamber therebetween, a tire surrounding said rim portion, each said wall having an annular braking surface and a set of apertures communicating between the air chamber in the body and the surrounding atmosphere inwardly and outwardly of each braking surface, and means for simultaneously applying a braking effort to both braking surfaces whereby the heat of friction generated during the braking effort will tend to expand the body tightly into the tire.

2. In a braking equipment of the character described, a wheel comprising a gray iron spider body including a tire receiving rim portion and opposed side walls extending integrally inwardly therefrom and forming an air chamber therebetween, a steel alloy tire surrounding said rim portion, each said wall having an annular braking surface and a set of apertures communicating between the air chamber in the body and the surrounding atmosphere inwardly and outwardly of each braking surface, and means for simultaneously applying a braking effort to both braking surfaces whereby the heat of friction generated during the braking effort will tend to expand the body tightly into the tire.

3. A wheel structure of the character described, comprising a body portion having laterally presented brake ring surfaces, said body portion being hollow to provide ventilating chambering therein and spaced side walls laterally defining said chambering, at least one said wall having air inlet apertures therein inwardly of its ring surface and air outlet apertures therein outwardly of its ring surface, and spaced blade members cast integrally with and between and reinforcing said walls at the positions of said ring surfaces and effective to induce circulation of air through said chambering.

4. A wheel structure of the character described, comprising a body portion having laterally presented brake ring surfaces, said body portion being hollow to provide ventilating chambering therein and spaced side walls laterally defining said chambering, at least one said wall having air inlet apertures therein inwardly of its ring surface and air outlet apertures therein outwardly of its ring surface, spaced blade members disposed between and reinforcing said walls at the positions of said ring surfaces and effective to induce circulation of air through said chambering, and additional wall reinforcing partition members equidistantly spaced between groups of said blade members and dividing said ventilating chambering into a plurality of individual air chambers each including a group of said blades.

5. A wheel structure of the character described, comprising a body portion having laterally presented brake ring surfaces, said body portion being hollow to provide ventilating chambering therein and spaced side walls laterally defining said chambering, at least one said wall having air inlet apertures therein inwardly of its ring surface and air outlet apertures therein outwardly of its ring surface, spaced blade members disposed between and reinforcing said walls at the positions of said ring surfaces and effective to induce circulation of air through said chambering, and additional wall reinforcing partition members equidistantly spaced between groups of said blade members and dividing said ventilating chambering into a plurality of individual air chambers each including a group of said blades, each said partition member terminating short of the center of the wheel to provide an annular uninterrupted chamber.

6. A wheel structure of the character described, comprising a body portion having a tire receiving rim portion and laterally presented brake ring surfaces, said body portion being hollow to provide ventilating chambering therein and spaced side walls integral with said rim portion and laterally defining said chambering, at least one said wall having air inlet apertures therein inwardly of its ring surface and air outlet apertures therein outwardly of its ring surface, spaced blade members disposed between and reinforcing said walls at the positions of said ring surfaces and effective to induce circulation of air through said chambering, said body portion being composed of gray iron or a material of equivalent braking efficiency, and a tire of steel alloy surrounding said body portion.

7. A wheel structure of the character described, comprising a body portion having a tire receiving rim portion and laterally presented brake ring surfaces, said body portion being hollow to provide ventilating chambering therein and spaced side walls integral with said rim portion and laterally defining said chambering, at least one said wall having air inlet apertures therein inwardly of its ring surface and air outlet apertures therein outwardly of its ring surface, spaced blade members disposed between and reinforcing said walls at the positions of said ring surfaces and effective to induce circulation of air through said chambering, additional wall reinforcing partition members equidistantly spaced between groups of said blade members and dividing said ventilating chambering into a plurality of individual air chambers each including a group of said blades, each said partition member terminating short of the center of the wheel to provide an annular uninterrupted chamber, said body portion being composed of gray iron or a material of equivalent braking efficiency, and a tire of steel alloy surrounding said body portion.

HENRY FORT FLOWERS.